(12) United States Patent
Jamin et al.

(10) Patent No.: US 12,542,540 B2
(45) Date of Patent: Feb. 3, 2026

(54) CONTROL UNIT FOR TRANSMISSION SYSTEM

(71) Applicant: NXP B.V., Eindhoven (NL)

(72) Inventors: Olivier Jérôme Célestin Jamin, Sainte Honorine du Fay (FR); Amandine Lesellier, Mondeville (FR)

(73) Assignee: NXP B.V., Eindhoven (NL)

( * ) Notice: Subject to any disclaimer, the term of this patent is extended or adjusted under 35 U.S.C. 154(b) by 63 days.

(21) Appl. No.: 18/735,988

(22) Filed: Jun. 6, 2024

(65) Prior Publication Data

US 2024/0413810 A1     Dec. 12, 2024

(30) Foreign Application Priority Data

Jun. 9, 2023   (EP) ..................................... 23305919

(51) Int. Cl.
*H03H 17/06*     (2006.01)
*H04L 25/05*     (2006.01)

(52) U.S. Cl.
CPC .... *H03H 17/0628* (2013.01); *H03H 17/0635* (2013.01); *H04L 25/05* (2013.01)

(58) Field of Classification Search
CPC .......... G01R 31/31727; G01R 31/3187; G01R 31/31709; G01R 31/31928; G01R 31/31932; G01R 31/31937; G01R 31/318385; H04L 7/0008; H04L 7/0004; H04L 7/0083; H04L 7/0337; H04L 1/205; H04L 12/6402; H04L 2012/5671; H04L 1/244; H04B 10/071; H04B 1/0475; H04B 10/0775; H04B 10/25; H04B 10/503; H04B 10/54; H04B 10/801; H04B 10/40; H04B 17/11; H04B 17/336; H04B 2210/074; H04B 5/48; H04B 1/52; H04W 12/06; H04W 4/02; H04W 64/00; H04W 74/08; H04W 56/0015
See application file for complete search history.

(56) References Cited

U.S. PATENT DOCUMENTS

| | | | | |
|---|---|---|---|---|
| 8,395,428 | B2 * | 3/2013 | Mateman | ............... H03L 7/0991 327/147 |
| 8,400,341 | B2 | 3/2013 | Su | |
| 8,861,571 | B2 | 10/2014 | Moradi et al. | |
| 9,755,792 | B1 * | 9/2017 | Lin | .......... H04L 1/244 |
| 9,882,707 | B1 * | 1/2018 | Yeo | .......... H04L 1/203 |

(Continued)

FOREIGN PATENT DOCUMENTS

| | | |
|---|---|---|
| CN | 101345886 B | 11/2011 |
| EP | 2751927 B1 | 2/2021 |
| EP | 4340218 A1 | 3/2024 |

*Primary Examiner* — Eva Y Puente (57) ABSTRACT

Control unit for a transmission system, including: a sample rate converter, which is coupled to a digital-to-analog converting unit, wherein digital input data (data_in) are feedable to the sample rate converter; a PRBS generator, wherein an output signal (ss_div) of the PRBS generator is feedable to the sample rate converter and to a delay element, wherein an output signal (ss_div_del) of the delay element is feedable to a frequency synthesizer, wherein the frequency synthesizer is clockable by a reference clock (clk_ref) and wherein an output signal (clk_ss) of the frequency synthesizer is feedable to a clock input of the sample rate converter and to a clock input of the digital-to-analog converting unit.

19 Claims, 8 Drawing Sheets

(56) References Cited

U.S. PATENT DOCUMENTS

| | | |
|---|---|---|
| 2008/0219331 A1 | 9/2008 | Liang et al. |
| 2009/0091486 A1 | 4/2009 | Wiesbauer et al. |
| 2013/0002457 A1* | 1/2013 | Tudose ................ H04L 7/0029 341/61 |
| 2021/0141347 A1* | 5/2021 | Vau ...................... G05B 13/047 |
| 2024/0162906 A1* | 5/2024 | Elmallah ................ H03L 7/107 |

* cited by examiner

CONTROL UNIT FOR TRANSMISSION SYSTEM

CROSS-REFERENCE TO RELATED APPLICATIONS

This application claims the priority under 35 U.S.C. § 119 of European Patent application no. 23305919.5, filed on 9 Jun. 2023, the contents of which are incorporated by reference herein.

TECHNICAL FIELD

The present disclosure relates to a control unit for a transmission system. Furthermore, the present disclosure relates to a method of operating a control unit for a transmission system.

BACKGROUND

Conventional RF transmitters somehow rely on a digital-to-analog converter DAC which produces an analog representation of a wanted digital signal. However, the DAC also generates images of the wanted signal around multiples of the DAC clock frequency images at:

$$k * fsam +/- fin$$

with:
k ... factor
fsam ... DAC clock frequency
fin ... input signal frequency

Standard and regulation bodies (FCC, ETSI, ARIB, etc.) specify quantitatively the maximum level of these spurious to mitigate disturbance toward other users of the spectrum (either other channels in the same communication system, or channels of another communication system).

U.S. Pat. No. 8,861,571 B2 discloses methods and apparatuses using filter banks for multi-carrier spread-spectrum signals.

U.S. Pat. No. 8,400,341 B2 discloses a non-uniform sampling technique using a voltage controlled oscillator.

EP 2 751 927 B1 discloses method and apparatus for performing data conversion with non-uniform quantization.

SUMMARY

It is an object of the present invention to provide an improved control unit for a communication system.

According to a first aspect, the present disclosure proposes a control unit for a transmission system, comprising:
  a sample rate converter, which is coupled to a digital-to-analog converting unit, wherein digital input data are feedable to the sample rate converter;
  a PRBS generator, wherein an output signal of the PRBS generator is feedable to the sample rate converter and to a delay element, wherein an output signal of the delay element is feedable to a frequency synthesizer, wherein the frequency synthesizer is clockable by a reference clock and wherein an output signal of the frequency synthesizer is feedable to a clock input of the sample rate converter and to a clock input of the digital-to-analog converting unit.

In this way, a specific signal processing is provided which is able to spread DAC images with reduced amplitudes over a defined frequency range, however counteracts to spread the fundamental of the digital-to-analog converting unit. In this way, the converting unit is being clocked with a spreaded clock in the frequency domain, wherein the clock is divided by a random number and wherein the DAC uses the spread-spectrum clock as a sampling clock.

As a result, the proposed control unit is able to counteract the effect that spread spectrum has on the fundamental component of the DAC output signal. Energy of the DAC images is spread because of the randomness of the clock period. In addition, a pre-distortion of digital input data is done in the sample rate converter, to counteract the effect that the spread spectrum has on the fundamental component of the DAC output signal.

According to a further aspect of the present disclosure proposes a method of operating a control unit for a transmission system, comprising the steps:
  feeding of digital input data to a sample-rate converter;
  feeding of an output signal of the PRBS generator to the sampling rate converter and to a delay unit;
  feeding an output signal of the delay unit to a frequency synthesizer, wherein the frequency synthesizer is clockable by a reference clock;
  feeding of an output signal of the frequency synthesizer to a clock input of the sample-rate converter and to a clock input of a converting unit, wherein the converting unit is adapted to convert the digital input data into analog output data.

A signal processing technique is provided in this way which is able to widely avoid the spreading of the DAC images, rather converts the DAC images to noise signal which may be much less harmful.

In one or more embodiments, the frequency synthesizer comprises a PLL, wherein an output signal of the PLL is feedable to a divider element, wherein the divider element is modulated by the output signal of the delay element, wherein an output signal of the divider element is feedable to a clock input of the sample rate converter, to a clock input of a control unit of the digital-to-analog converting unit and to a clock input of a DAC element.

Clock cycle clock are thus divided by different numbers, which enables to spread the energy of the clock due to randomness.

In one or more embodiments, the control unit is adapted to control analog output data of the DAC element.

In one or more embodiments, the control of the DAC element is performed by means of an output signal of the control unit.

In one or more embodiments, a first digital control word is feedable to the sample rate converter and wherein a second digital control word is feedable to the PLL. By means of the AM control word an amplitude of the analog output signal of the sample rate converter can be controlled.

In one or more embodiments, the sample rate converter comprises FIR filters, wherein output signals of the FIR filters are feedable to corresponding FIFOs, wherein output signals of the FIFOs are combined by multipliers, wherein the multipliers are clockable by a signal representing a dynamic ratio of clocks, wherein the dynamic ratio is obtained by multiplexing of ratios corresponding to the clock period of the output signal of the divider element.

In one or more embodiments, the dynamic ratio is generated by a ratio element to which the output signal of the divider element is feedable. The sample-rate converter is adapted by making an increment of the sample-rate converter to become a time-varying signal, which value changes with the spread-spectrum division factor.

In one or more embodiments, an output signal of the sample rate converter is feedable to the control unit of a digital-to-analog converting unit. In this way, the digital-to-analog converting unit is able to generate analog output data from digital input data in the above mentioned optimized sense.

In one or more embodiments, the sample rate converter comprises a cascade of a fractional sample rate converter with an integer sample rate converter. Preferably, the cascade of a fractional sample rate converter comprises a Farrow Sample Rate converter and the integer sample rate converter comprises a CIC sample rate converter.

In one or more embodiments, the control unit is adapted to spread DAC-images of the digital-to-analog converting unit with a defined lowered amplitude over a defined frequency range and to avoid to spread a fundamental of the digital-to-analog converting unit over the defined frequency range.

BRIEF DESCRIPTION OF DRAWINGS

The above discussion/summary is not intended to describe each embodiment or every implementation of the present disclosure. The drawings and detailed description that follow also exemplify various embodiments. The aspects defined above and further aspects of the present disclosure are apparent from the examples of embodiment to be described hereinafter with reference to the appended drawings, which are explained with reference to the examples of embodiment. However, the disclosure is not limited to the examples of embodiments.

All illustrations in the drawings are schematical. It is noted that in different figures, similar or identical elements or features are provided with the same reference signs or with reference signs that are different from the corresponding reference signs only within the first digit. In order to avoid unnecessary repetitions, elements or features which have already been elucidated with respect to a previously described embodiment are not elucidated again at a later position of the description.

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DESCRIPTION OF EMBODIMENTS

Figure 1:
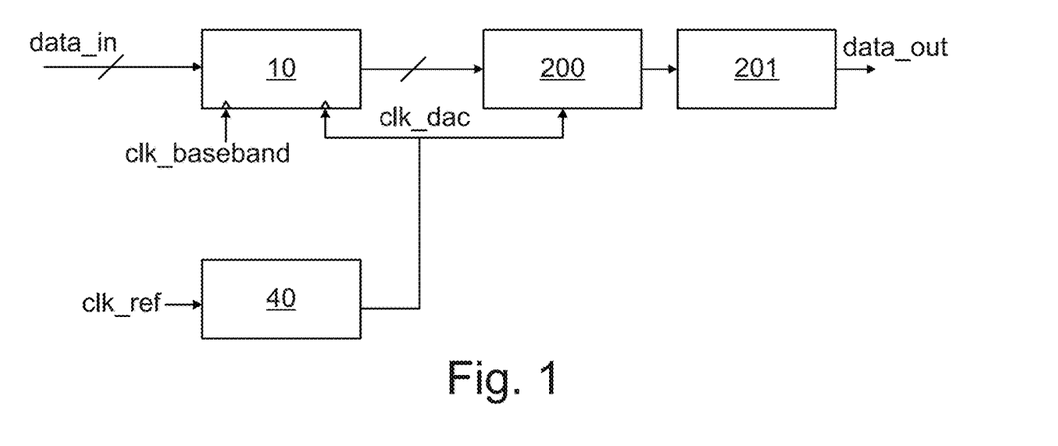
FIG. 1 shows a conventional general transmission system.

FIG. 1 shows a general block diagram of a conventional baseband transmitter, which uses a sample rate converter 10 to increase a sample rate of digital input data data_in from a low-speed baseband processing to a high-speed digital-to-analog converting unit 200 and a reconstruction device 201. One recognizes a signal path between the digital input data data_in and analog output data data_out and a clock path providing clock signals for the components of the signal path. A baseband clock clk_baseband might also be the reference clock clk_ref and vice versa. As an exemplary implementation, the digital input data data_in is clocked by means of the baseband clock clk_baseband and a frequency synthesizer 40 is clocked by a reference clock clk_ref. Also alternative arrangements with respect to clock signals are conceivable (not shown).

The digital input signal clk_baseband clocked at a baseband fixed sample rate is up-sampled to the digital-to-analog converting unit 200 with the DAC fixed clock frequency clk_dac, then provided as an input to the digital-to-analog converting unit 200. In this way, the digital-to-analog converting unit 200 converts the digital input data data_in to analog output data, wherein the signal is right after filtered by the reconstruction filter 201.

Figure 2:
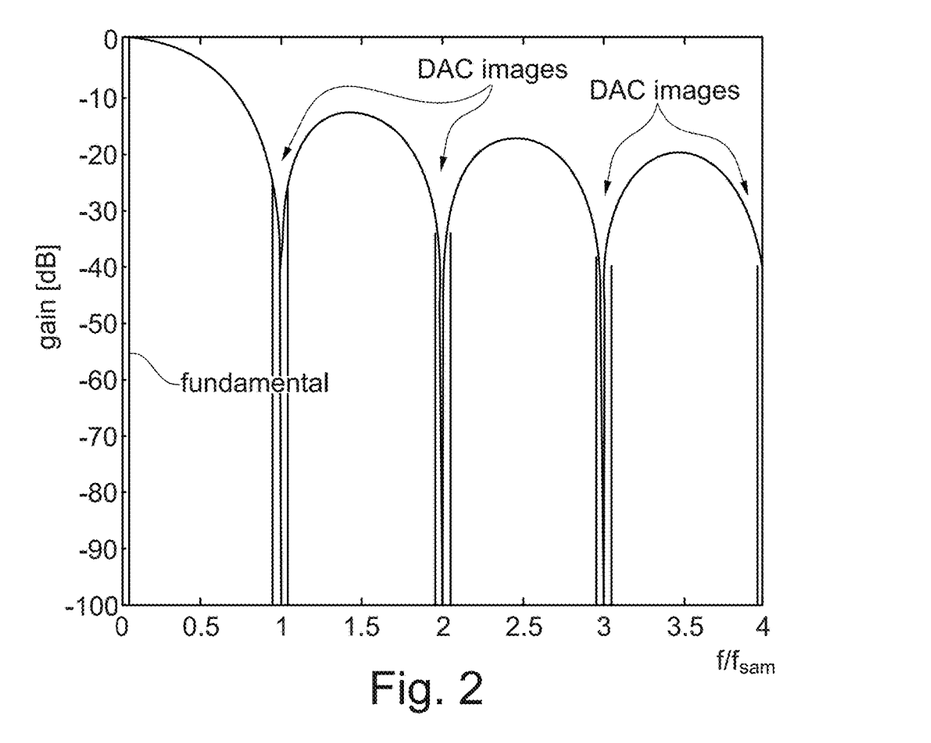
FIG. 2 is a diagram showing outputs of the transmission system of FIG. 1.

FIG. 2 shows an effect of the system of FIG. 1 formed as a gain over frequency diagram. Due to the fact that a sampled system is given, copies of the signal are generated, so called "DAC-images" at every sampling rate frequency $f_{sam} \pm fin$, wherein fin is the frequency of the fundamental. Arcs represent sin x/x response of a classical DAC. One recognizes DAC images (spikes) which are discrete copies of the fundamental signal and could thus be problematic for additional RF communication systems operating in this frequency range. These DAC images fall into forbidden bands and may be problematic with other RF communication systems.

A transmitter designer can somehow mitigate the effect of the DAC images by (i) increasing the DAC sampling rate (to push the image further in the frequency domain to a higher frequency and get more attenuation from the native sin (x)/x DAC response) or by (ii) increasing the order of the reconstruction filter 201 (to attenuate the amplitude of the image). However, both alternatives may have costs in current and/or chip area.

Figure 3:
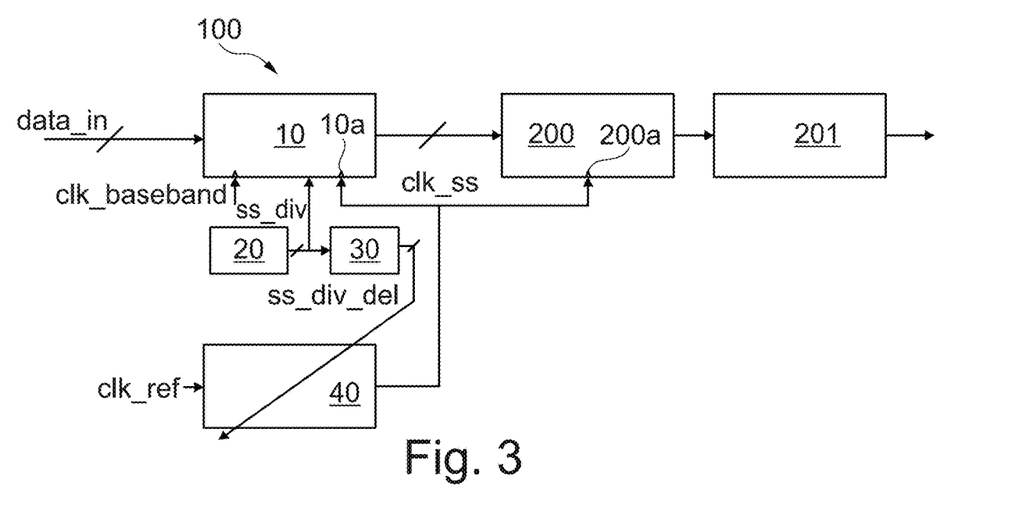
FIG. 3 shows a first embodiment of a proposed control unit with a transmission system.

FIG. 3 shows a block diagram of a proposed control unit 100 in a general RF baseband transmitter. A reference clock clk_ref is applied to a frequency synthesizer 40 which generates a spread-spectrum modulated high-speed clock clk_ss by means of a delay element 30, which is driven by an output signal ss_div (spread spectrum modulated high speed clock) of the digital PRBS generator 20. Said high-speed clock clk_ss is spread-spectrum modulated, wherein the digital PRBS generator 20 is used as an input control for the clock modulation, wherein the digital PRBS generator 20 generates input control words for a downstream digital-to-analog converting unit 200. The clock ss_div is applied to the sample-rate converter 10, which performs a sample rate conversion and pre-distorts the input signal, such that its amplitude corresponds to the instants of the rising edge of the spread-spectrum modulated clock clk_ss, being applied to a clock input 200a of the digital-to-analog converting unit 200, wherein the digital-to-analog converting unit 200 itself uses this spread-spectrum clock clk_ss as a sampling clock. The output signal of the digital-to-analog converting unit 200 is filtered by a simplified (lower-order) reconstruction filter 201. A divider element (not shown) is arranged inside a PLL loop of the frequency synthesizer 40.

Figure 4:
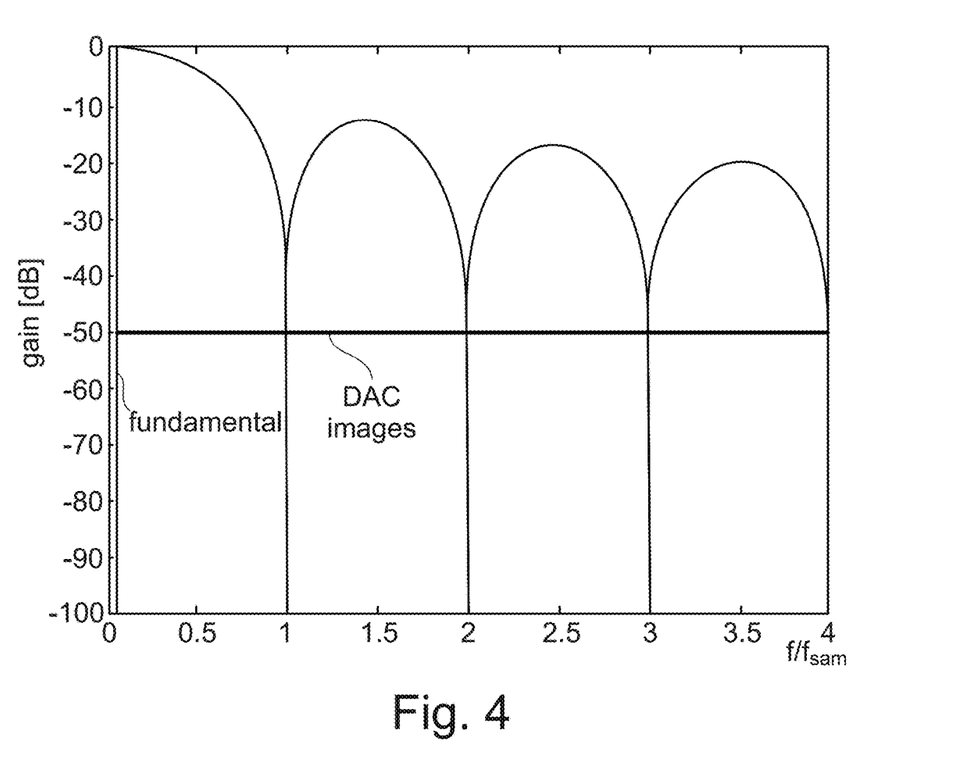
FIG. 4 is a diagram showing outputs of the transmission system of FIG. 3.
Figure 5:
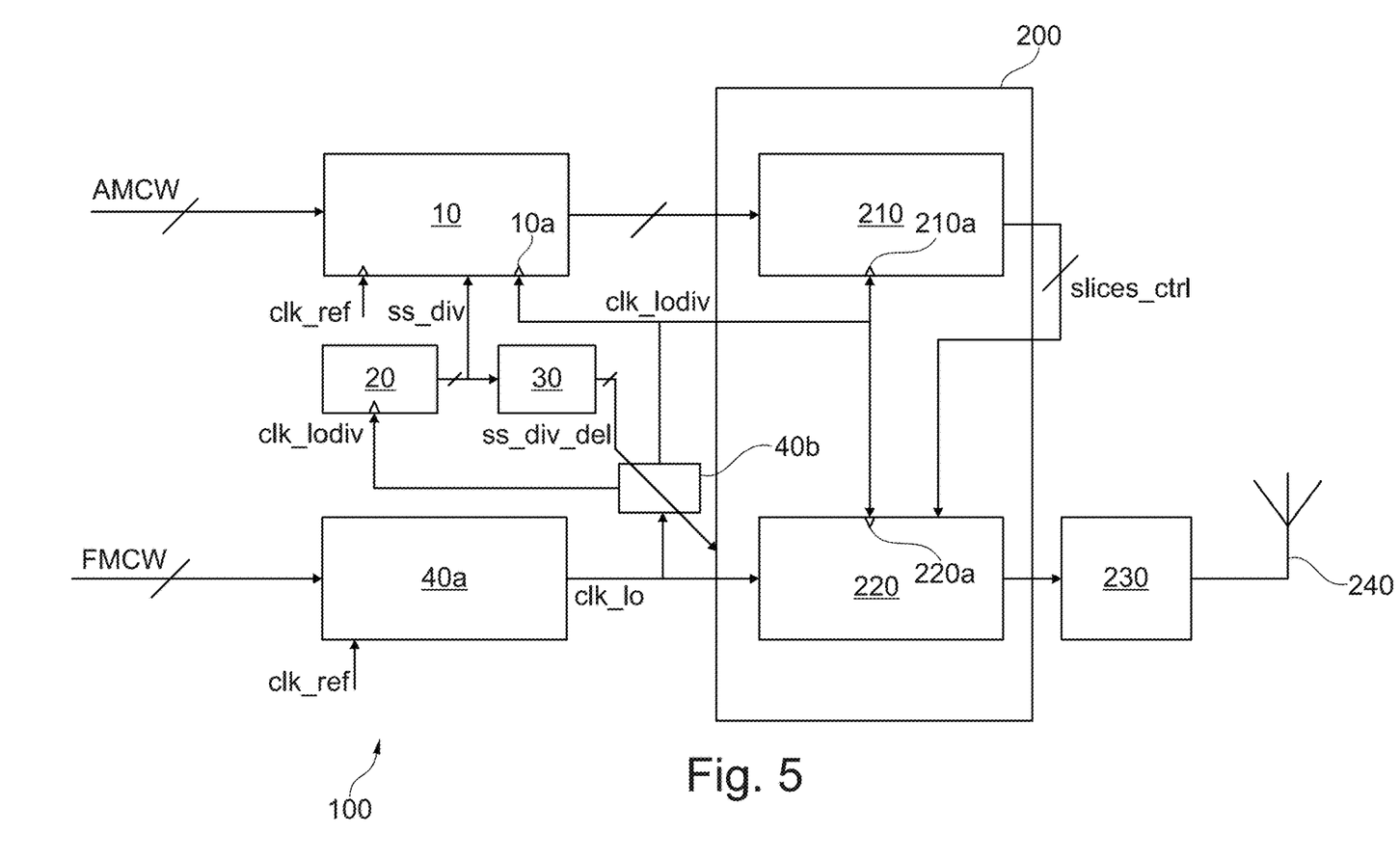
FIG. 5 shows a second embodiment of a proposed control unit with a transmission system.

FIG. 4 shows outputs of the arrangement of FIG. 3. One recognizes that DAC images are now, in comparison with FIG. 2 at a lower level and spread across the frequency range. In this way, the DAC images can be much more compatible with additional RF communication systems (not shown). The fundamental, however, is unchanged compared to FIG. 2. FIG. 5 shows an exemplary embodiment the proposed control unit 100 in an AM or polar RF transmitter. In this context, a typical challenging problem can be the coexistence of a BT EDR TX (Bluetooth Extended Data Rate TX, not shown) co-located with a WiFi receiver (not shown) in the 2.4 GHz/5 GHZ/6 GHz bands, both operating at the same time. Spurious emissions targeted by the BT EDR TX shall be low enough in order to not limit the WiFi RX performance. In this example, the TX modulation may contain some part of amplitude modulation. In some applications, the modulation can be AM only, while in other applications it can be a mix of AM with FM/PM. The PRBS generator 20 may be implemented with a LFSR (linear-feedback shift register) architecture.

One recognizes first digital input data formed as an amplitude modulation control word AMCW and second digital input data formed as a frequency modulation control word FMCW. The proposed control unit 100 focuses on this last case of combined AM and FM. The AM path comprises a sample rate converter 10, an optional delta-sigma modulator in a control device 210 and a RF digital PA slice array 220 for the generation of analog output data. The PA slices array 220 might be implemented e.g. as a binary array, a thermometric array or a combination of both. The optional sigma delta modulator of the control device 210 is used in order to minimize or at least to reduce the number of slices in the power amplifier for a given accuracy. A decoder of the control device 210 translates the digital amplitude modulation control word coming from the sample rate converter 10 to a control word which is tailored to the PA slices array 220. A number of RF digital PA slices, which are turned ON at a given instant by means of the PA slice array 220 is proportional to the digital decoder output word value slices_ctrl. The decoder of the control device 210 is an interface, which converts the digital input control word into a signal directly used to control (turn on or turn off) the individual PA slices.

A frequency synthesizer formed as a PLL 40a in combination with a divider element 40b provides an LO signal to the Radio Frequency Power Amplifier (RF PA). This LO signal is at least centered around a carrier frequency and might contain the FM modulation requested by the targeted standard. The divider element 40b divides the PLL output signal clk_lo to generate a high-speed clock clk_lodiv for the AM path, i.e. the sample rate converter 10 plus the control device 210 and the PA slices array 220. The PRBS generator 20 provides a random digital word directly to the sample-rate converter 10 (formed as signal ss_div) and delayed to the divider element 40b (formed as signal ss_div_del) in order to modulate the division factor of the divider element 40b, in this way generating a spread-spectrum modulated clock clk_lodiv. The spread-spectrum modulated clock clk_lodiv is used, similarly as in the arrangement of FIG. 3 as an output clock by the sample rate converter 10 and is also used by the digital-to-analog converting unit 200. The sample rate converter 10 itself gets the random digital word ss_div and uses it to adapt the sample rate converter processing in order to calculate the amplitude of the output signal at the exact instant of the rising edge of the spread-spectrum modulated clock clk_lodiv.

It can also be that the divider is not located at the PLL output but inside the PLL loop (as shown in FIG. 3 for instance).

The delay element 30 is used to compensate for the latency of ss_div signal path thru the sample rate converter element 10.

The digital to analog converting unit 200 controls a RF front end 230 (comprising inductors, capacitors, transformers, etc.) which can be seen to implement the functionality of the reconstruction unit 201 of FIGS. 1 and 3 and which feeds an antenna 240 with analog data. In this way an RF transmitter is implemented within a communication system.

Figure 6:
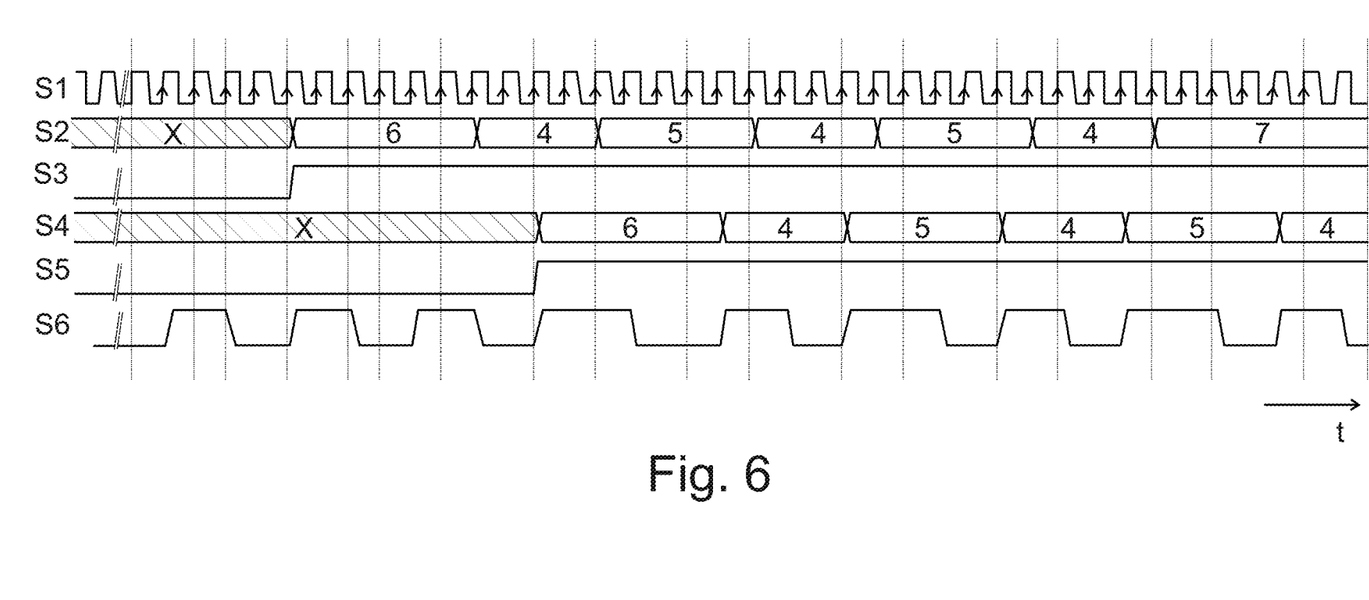
FIG. 6 is a timing diagram showing clock signals.

FIG. 6 shows an example sequence of a clock modulation, performed by the PRBS generator 20 and the programmable synchronous clock divider element 40b. Shown are six signals S1 . . . S6:
S1 . . . LO clock clk_lo
S2 . . . output signal of PRBS generator 20
S3 . . . PRBS generator ready
S4 . . . delayed output signal of PRBS generator
S5 . . . PRBS generator ready delayed
S6 . . . spread spectrum modulated clock clk_lodiv Depending on its input control word, the divider element 40b changes its division factor M (e.g. 6, 4, 5, 4, 5, 4, 7, etc.). The divided clock clk_lodiv period is modulated by the specific number provided by the PRBS generator 20 at a defined point in time. FIG. 6 shows what is meant by "spreading the clock": One recognizes that the period of clk_lodiv is not constant and is varying over time t.

Figure 7:
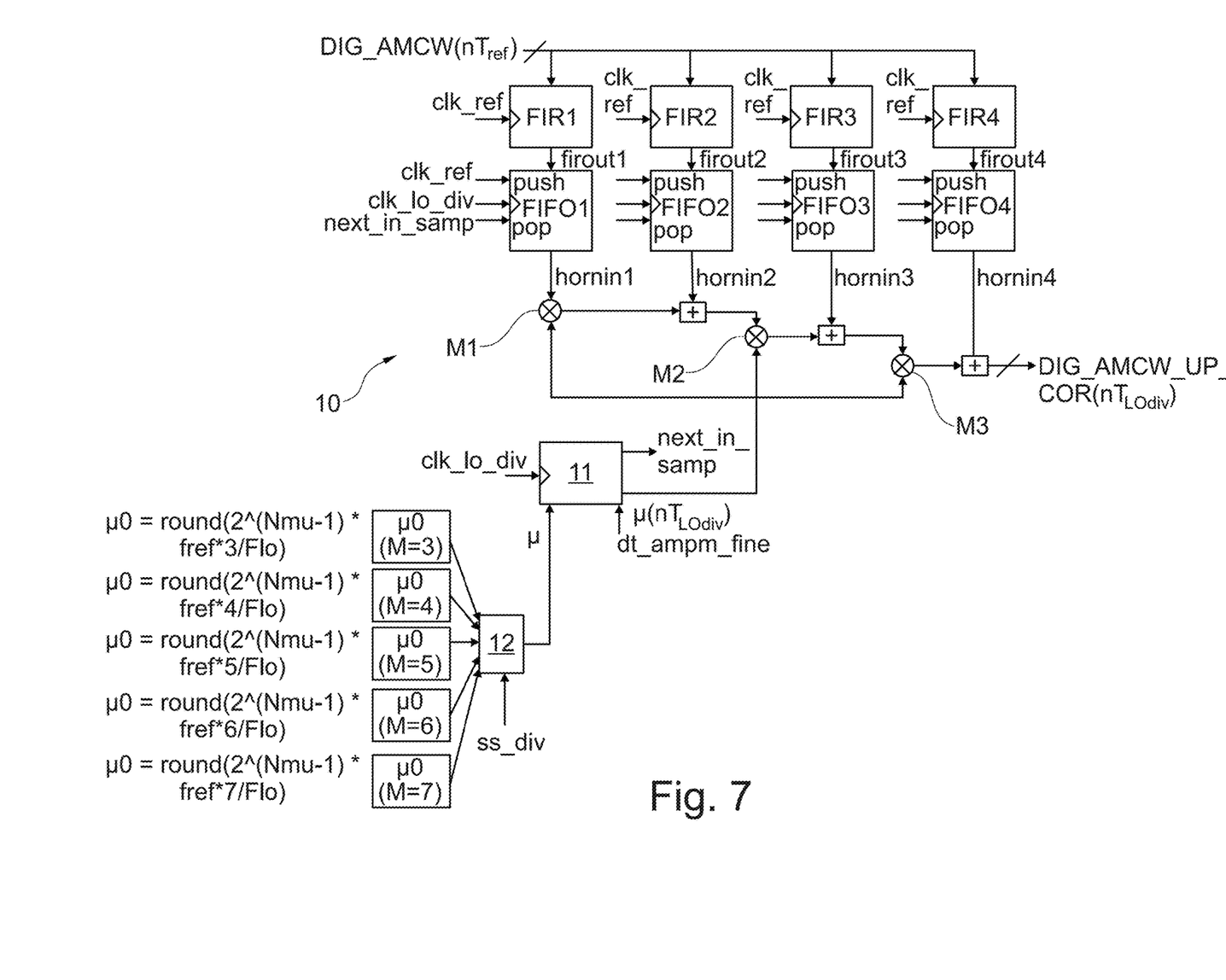
FIG. 7 is a detailed view of a sample rate converter as being used by the proposed control unit.

FIG. 7 shows the sample rate converter 20 in more detail which is structured as a Farrow Rate Converter block, which converts the sample rate of a signal by using exemplary four FIR filters FIR1 . . . . FIR4, thus implementing a polynomial sinc approximation. A Farrow Rate Converter block filter is an efficient rate converter when the rate conversion factor is a ratio of large integer decimation and interpolation factors. It specifies a rate conversion factor by providing the input sample rate and the desired output sample rate. The rate conversion factor can be provided as a fixed parameter or as a time-varying input signal. The Farrow Rate Converter block uses Horner's rule to compute samples from the polynomial, which is implemented with the four FIR filters FIR1 . . . . FIR4, wherein each FIR filter is an instance of the discrete FIR filter block. When minimum number of cycles between valid input samples is greater than one, the block implements each FIR subfilter as a partly-serial architecture that shares the multipliers in time.

The output signal of each FIR filter FIR1 . . . FIR4 is added to the result of the previous stage, cast to the output data type, then multiplied by means of multipliers M1 . . . M3 by the current value of a generator element 11 being supplied by an output signal of an accumulator 12. The accumulator 12 operates on the fractional part of the rate change, and uses a data type derived from the rate change data type.

One recognizes modifications brought to a polynomial-based sample rate converter 10, implemented with a Farrow structure, which is used by the proposed control unit 100. The digital AMCW word is fed to the four FIR filters FIR1 . . . FIR4, each FIR filter having a downstream FIFO, in this way implementing an order three of a Lagrange polynomial interpolation. The output of the FIR filters FIR1 . . . FIR4 is a linear combination of input samples of the filters. All FIR filters FIR1 . . . FIR4 are driven by means of the reference clock signal clk_ref. In this way, the combining of the outputs of the FIR filters FIR1 . . . FIR4 is done at high speed.

The generator element 11 is basically an accumulator or integrator, respectively, which is driven by a ratio μ0 between the reference clock clk_ref running at frequency fref and the clock clk_lo_div running at f_lo_div. Both clock signals clk_ref, clk_lodiv are supplied to the sample rate converter 10.

An output signal μ (nTlodiv) of the generator element 11 being implemented within the sample rate converter 10 is a function of time and not a fixed value as in conventional generator elements 11 (not shown) μ0(nT)=fref/fout (nT). The frequency fout is non-constant and has discrete values as shown in the lower left section of FIG. 7 and which correspond to values of u to different time points. In this way several values of 0 are multiplexed by the multiplexer 12, depending on the clock factor division, wherein an output signal of the multiplexer 12 is supplied to the generator element 11. The signal dt_ampm_fine being input to the generator element 11 is used to perform a fine delay adjustment of the sample rate converter in order to accurately equalize the delays through AM path and FM path.

One recognizes that a proper calculation of the output signal amplitude at the rising edges of the spread-spectrum clock consists in multiplexing several values of μ0 (in the example shown M=[3; 7], μ0=[frefx7/flo); frefx6/flo); frefx 5/flo); frefx4/flo); fref/(3xflo)] instead of one fixed value μ0=fref/(Mxflo)) toward the u-generator input (u-generator accumulates the fractional part of the interpolation), theses several values corresponding to the several values of the clock division factor M provided by the dividing element 40b. An output signal DIG_AMCW_UP_COR (nTlodiv) is then supplied to the control device 210 of the digital-to-analog converting unit 200.

As a result, the sample rate converter 10 is modified by making the increment (μ(nxTlodiv)) of the sample-rate converter 10 to become a time-varying signal, which value changes with the spread-spectrum division factor. The proposed method proposes how to determine the required change of u as a function of the division factor M provided by the divider element 40b.

In this way, since the clock is modulated, the sample rate converter 10 is adapted to calculate the amplitude of the output signal of the sample rate converter 10 exactly at the instants of the modulated clock signal.

In this way the spreading of the fundamental signal can be counteracted, whereas the DAC images are spread. The proposed control unit 100 provides low spectral emissions without increasing neither the reconstruction filter order nor the DAC sample rate. This is achieved in that the DAC clock period is modulated. Furthermore, a digital modulation control word is generated by means of the digital PRBS generator 20 which provides a finite and known number of clock division ratios. This digital random clock division factor is used to control the division factor M of a high-speed clock divider 31. The sample-rate converter 10 uses the digital random clock division factor to pre-distort the amplitude of its output signal so that the output signal amplitude is calculated at the instants of the rising edge of the modulated clock.

Resulting therefrom, the fundamental of the input signal is not distorted by the DAC clock modulation, wherein only the DAC images are spread. In this way the DAC clock and the order of the reconstruction filter 201 can be drastically reduced.

Figure 8:
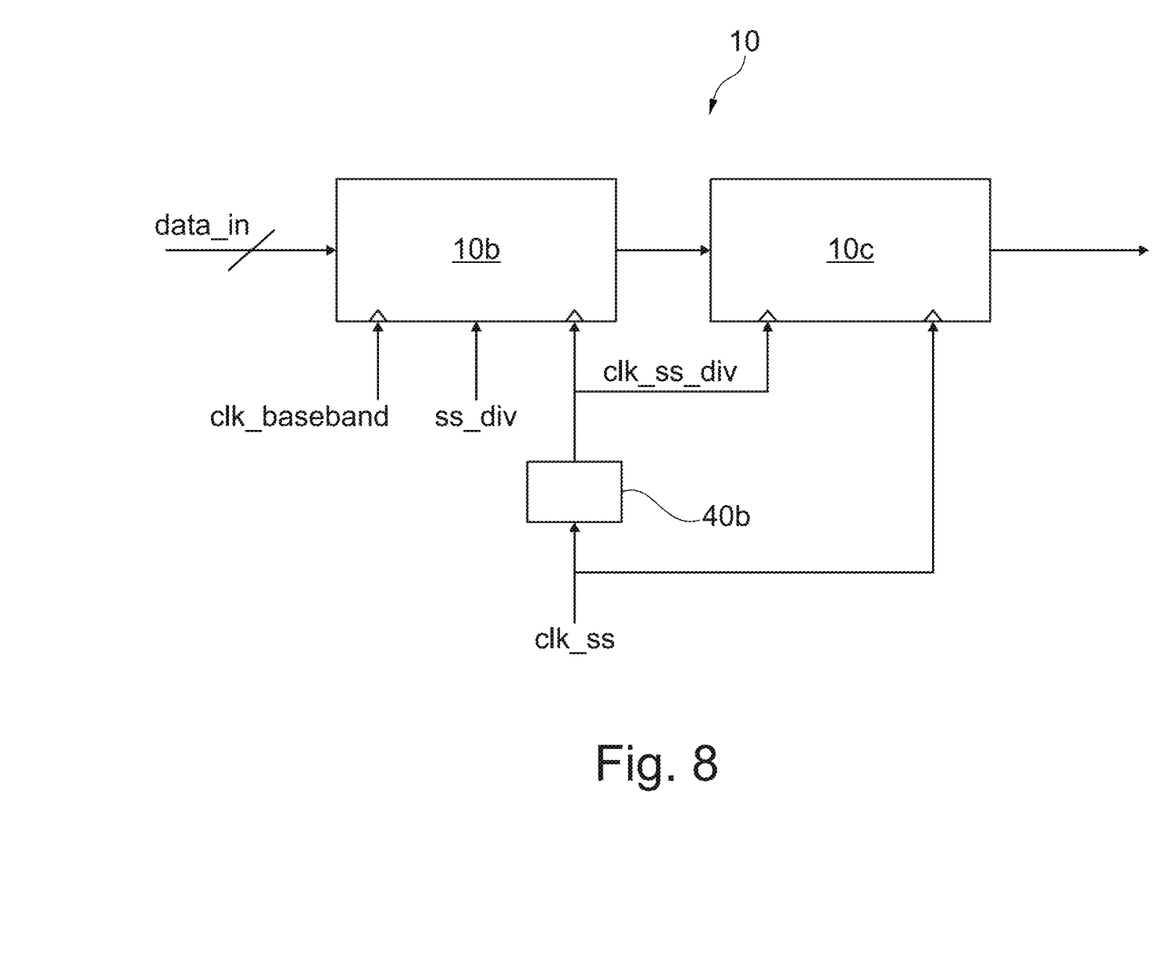
FIG. 8 is a diagram showing an implementation of a sample-rate converter.

FIG. 8 shows an implementation of the sample rate converter 10 a cascade of a fractional sample rate converter 10b (e.g. Farrow Sample Rate converter) with an integer sample rate converter 10c (e.g. CIC sample Rate converter).

Figure 9:
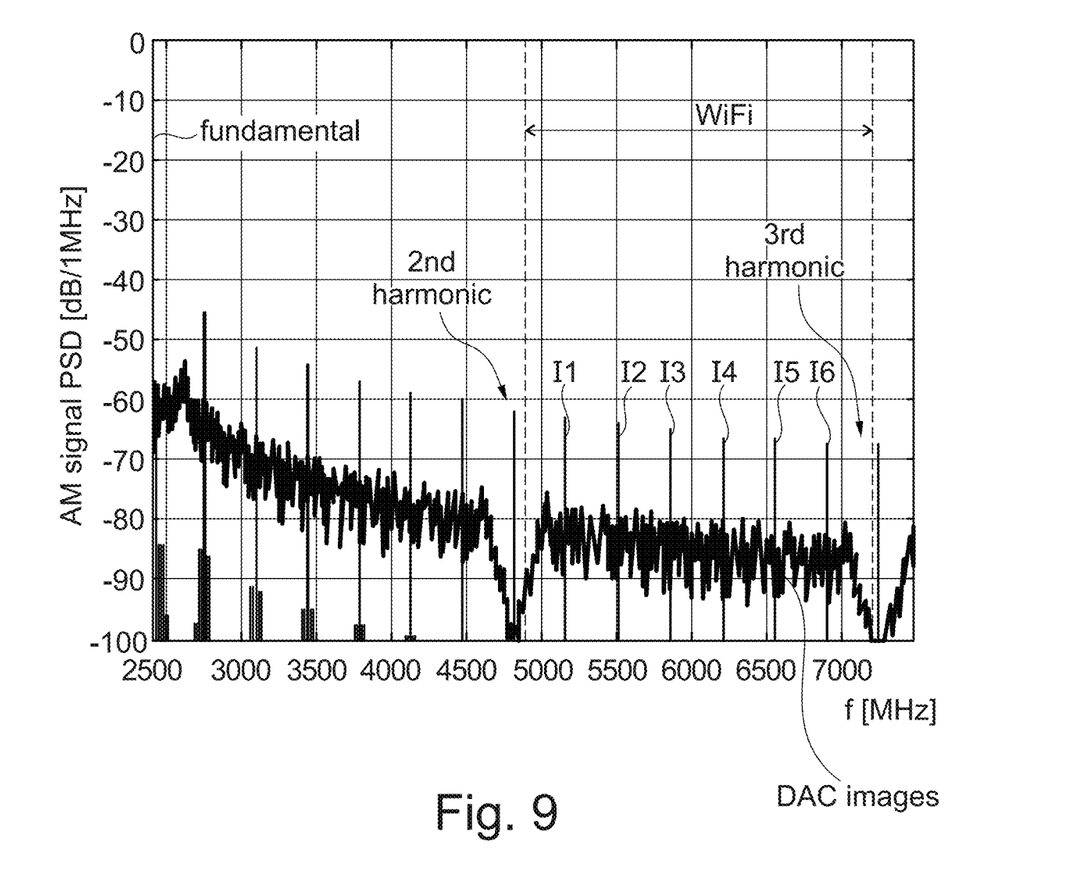
FIG. 9 is a diagram showing output signals of a transmission system being controlled by the proposed control unit.

FIG. 9 shows a AM signal PSD (Power spectral density) over frequency diagram with an effect of the proposed method. One recognizes AM path clocked at a fixed frequency, the BT TX generates six DAC images around −62 dBc in the 5G/6G Wi-Fi RX frequency band (shown as WiFi).

The PRBS generator 20 generates integer numbers in the range [4 5 6 7 8 9 10], which modulates the AM path clock from Flo/10 up to Flo/4. This results in a reduction of the DAC images by more than 15 dB, which is less harmful from the 5G/6G Wi-Fi RX perspective, while the fundamental component (left section of FIG. 8) is not distorted/spread. In effect, the spectral emission of the DAC images is relatively "white", which supports a co-existence of RF communication systems implemented in different technologies.

Applications of the control unit 100 are transmitters relying on a digital-to-analog converter system, e.g. polar RF transmitters as shown in FIG. 5, narrow band transmitters, ZigBee transmitters, etc.

Aspects of the present disclosure are believed to be applicable to a variety of different types of apparatuses, systems and methods involving radar systems and related communications. In certain implementations, aspects of the present disclosure have been shown to be beneficial when used in the context of automotive radar in environments susceptible to the presence of multiple objects within a relatively small region. While not necessarily so limited, various aspects may be appreciated through the following discussion of non-limiting examples which use exemplary contexts.

Figure 10:
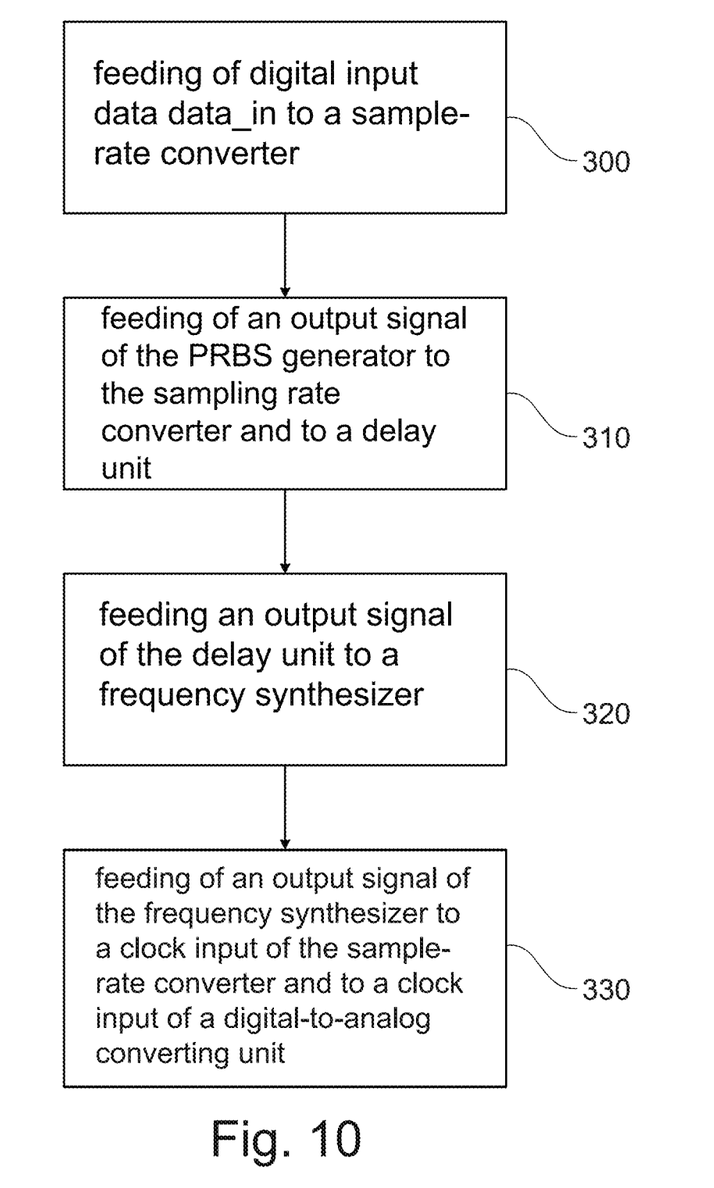
FIG. 10 is a diagram with a flow of the proposed method of operation a control unit for a transmission system.

FIG. 10 shows a flow of a proposed method of operating a control unit for a transmission system.

In a step 300 a feeding of digital input data data_in to a sample-rate converter 10 is performed.

In a steps 310 a feeding of an output signal of the PRBS generator 20 to the sampling rate converter 10 and to a delay unit 30 is performed.

In a step 320 a feeding an output signal of the delay unit 30 to a frequency synthesizer 40 is performed, wherein the frequency synthesizer 40 is clocked by a reference clock clk_ref.

In a step 330 a feeding of an output signal of the frequency synthesizer 40 to a clock input 10a of the sample-rate converter 10 and to a clock input 110a of a digital-to-analog converting unit 200 is performed, wherein the digital-to-analog converting unit 200 is adapted to convert the digital input data data_in into analog output data.

The present disclosure proposes spread of a transmitter images without spreading the fundamental signal. This is done by preserving the fundamental signal purity by pre-distorting the digital signal toward the DAC in a sample rate converter. This is achieved by calculating the Sample Rate Converter output signal at the exact instants of the rising edges of the spread-spectrum clock used by the DAC, including a multiplexing between several time increments in a Farrow sample rate converter.

In the foregoing description various specific details have been set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference signs may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As examples, the specification describes and/or illustrates aspects useful for implementing the claimed disclosure by way of various circuits or circuitry which may be illustrated as or using terms such as blocks, modules, device, system, unit, controller, etc. and/or other circuit-type depictions. Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU, in one example the logic circuitry may carry out a process or method (sometimes "algorithm") by performing such activities and/or steps associated with the above-discussed functionalities. In other examples, the logic circuitry may carry out a process or method by performing these same activities/operations.

For example, in certain of the above-discussed embodiments, one or more modules are discrete logic circuits or programmable logic circuits configured and arranged for implementing these operations/activities. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the specification may make reference to a "first" type of structure, a "second" type of structure, where the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize, that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps.

It should be noted that the term "comprising" does not exclude other elements or steps and "a" or "an" does not exclude a plurality. Also elements described in association with different embodiments may be combined. It should also be noted, that reference signs in the claims should not be construed as limiting the scope of the claims.

The discloses devices, apparatuses, units, elements, systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which may include storage devices and signals, in compressed or uncompressed form.

It is noted that the embodiments above have been described with reference to different subject-matters. In particular, some embodiments may have been described with reference to method-type claims whereas other embodiments may have been described with reference to apparatus-type claims.

However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

It has to be noted that embodiments have been described with reference to different subject matters. In particular, some embodiments have been described with reference to method type claims whereas other embodiments have been described with reference to apparatus type claims.

However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

REFERENCE SIGNS 10 sample-rate converter
10a clock input
10b fractional sample-rate converter
10c integer sample-rate converter
11 generator element
20 PRBS generator
30 delay element
40 frequency synthesizer
40a PLL
40b divider element
100 control unit
200 digital-to-analog converting unit
200a clock input
201 reconstruction unit
210 control device
220 PA slices array
230 RF front end
240 antenna
300 . . . 330 method steps
f fundamental
I1 . . . I6 images
M clock division factor

What is claimed is:

1. Control unit for a transmission system, comprising:
   a sample rate converter, which is coupled to a digital-to-analog converting unit, wherein digital input data are feedable to the sample rate converter; and
   a PRBS generator, wherein an output signal of the PRBS generator is feedable to the sample rate converter and to a delay element, wherein an output signal of the delay element is feedable to a frequency synthesizer, wherein the frequency synthesizer is clockable by a reference clock and wherein an output signal of the frequency synthesizer is feedable to a clock input of the sample rate converter and to a clock input of the digital-to-analog converting unit.

2. Control unit according to claim 1, wherein the frequency synthesizer comprises a PLL, wherein an output signal of the PLL is feedable to a divider element, wherein the divider element is modulated by the output signal of the delay element, wherein an output signal of the divider element is feedable to a clock input of the sample rate converter, to a clock input of a control unit of the digital-to-analog converting unit and to a clock input of a DAC element.

3. Control unit according to claim 2, wherein the control unit is adapted to control analog output data of the DAC element.

4. Control unit according to claim 2, wherein the control of the DAC element is performed by means of an output signal of the control unit.

5. Control unit according to claim 2, wherein a first digital control word is feedable to the sample rate converter and wherein a second digital control word is feedable to the PLL.

6. Control unit according to claim 2, wherein the sample rate converter comprises FIR filters, wherein output signals of the FIR filters are feedable to corresponding FIFOs, wherein output signals of the FIFOs are combined by multipliers, wherein the multipliers are clockable by a signal representing a dynamic ratio of clocks, wherein the dynamic ratio is obtained by multiplexing of ratios corresponding to the clock period of the output signal of the divider element.

7. Control unit according to claim 6, wherein the dynamic ratio is generated by a ratio element to which the output signal of the divider element is feedable.

8. Control unit according to claim 3, wherein an output signal of the sample rate converter is feedable to the control unit.

9. Control unit according to claim 1, wherein the sample rate converter comprises a cascade of a fractional sample rate converter with an integer sample rate converter.

10. Control unit according to claim 9, wherein the cascade of a fractional sample rate converter comprises a Farrow Sample Rate converter and the integer sample rate converter comprises a CIC sample rate converter.

11. Control unit according to claim 1, wherein the control unit is adapted to spread DAC-images of the digital-to-analog converting unit with reduced images power spectral density over a defined frequency range to avoid to spread a fundamental of the digital-to-analog converting unit.

12. Control unit for a transmission system, comprising:
   a sample rate converter, which is coupled to a digital-to-analog converting unit, wherein digital input data are feedable to the sample rate converter; and
   a PRBS generator, wherein an output signal of the PRBS generator is feedable to the sample rate converter and to a delay element, wherein an output signal of the delay element is feedable to a frequency synthesizer, wherein the frequency synthesizer is clockable by a reference clock and wherein an output signal of the frequency synthesizer is feedable to a clock input of the sample rate converter and to a clock input of the digital-to-analog converting unit, wherein the control unit is adapted to spread DAC-images of the digital-to-analog converting unit with reduced images power spectral density over a defined frequency range to avoid to spread a fundamental of the digital-to-analog converting unit.

13. Method of operation a control unit for a transmission system, comprising the steps:
   feeding of digital input data to a sample-rate converter;
   feeding of an output signal of the PRBS generator to the sampling rate converter and to a delay unit,
   feeding an output signal of the delay unit to a frequency synthesizer, wherein the frequency synthesizer is clockable by a reference clock; and
   feeding of an output signal of the frequency synthesizer to a clock input of the sample-rate converter and to a clock input of a digital-to-analog converting unit, wherein the digital-to-analog converting unit is adapted to convert the digital input data into analog output data.

14. Method according to claim 13, wherein an output signal of a PLL is fed to a divider element, wherein the divider element is modulated by the output signal of the delay element, wherein an output signal of the divider element is fed to a clock input of the sample rate converter, to a clock input of a control unit of the digital-to-analog converting unit and to a clock input of a DAC element.

15. Method according to claim 14, wherein the control unit spreads DAC-images of the digital-to-analog converting unit with reduced images power spectral density over a defined frequency range to avoid to spread a fundamental of the digital-to-analog converting unit.

16. Method according to claim 14, wherein the control unit controls analog output data of the DAC element.

17. Method according to claim 14, wherein the control of the DAC element is performed by means of an output signal of the control unit.

18. Method according to claim 14, wherein a first digital control word is fed to the sample rate converter and wherein a second digital control word is fed to the PLL.

19. Method according to claim 14, wherein the sample rate converter comprises FIR filters, wherein output signals of the FIR filters are fed to corresponding FIFOs, wherein output signals of the FIFOs are combined by multipliers, wherein the multipliers are clocked by a signal representing a dynamic ratio of clocks, and wherein the dynamic ratio is obtained by multiplexing of ratios corresponding to the clock period of the output signal of the divider element.

* * * * *